(12) United States Patent
Krishnamachari (10) Patent No.: US 10,739,193 B2
(45) Date of Patent: Aug. 11, 2020

(54) DYNAMIC LOCK-IN DETECTION BANDWIDTH FOR SRS IMAGING

(71) Applicant: Leica Microsystems CMS GmbH, Wetzlar (DE)

(72) Inventor: Vishnu Vardhan Krishnamachari, Seeheim-Jugenheim (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 0 days.

(21) Appl. No.: 15/766,838

(22) PCT Filed: Oct. 10, 2016

(86) PCT No.: PCT/EP2016/074176
§ 371 (c)(1),
(2) Date: Apr. 9, 2018

(87) PCT Pub. No.: WO2017/060519
PCT Pub. Date: Apr. 13, 2017

(65) Prior Publication Data
US 2018/0283939 A1   Oct. 4, 2018

(30) Foreign Application Priority Data

Oct. 9, 2015   (EP) .................................. 15189132

(51) Int. Cl.
*G01J 1/44*   (2006.01)
*G01J 3/44*   (2006.01)
(Continued)

(52) U.S. Cl.
CPC .................. *G01J 1/44* (2013.01); *G01J 3/027* (2013.01); *G01J 3/44* (2013.01); *G02B 21/0084* (2013.01); *G01J 2001/4406* (2013.01)

(58) Field of Classification Search
CPC ..... G01J 1/44; G01J 3/057; G01J 3/44; G02B 21/0084
See application file for complete search history.

(56) References Cited

U.S. PATENT DOCUMENTS 7,283,242 B2 * 10/2007 Thornton ........... A61B 5/14532
356/432
7,633,621 B2 * 12/2009 Thornton ........... A61B 5/14532
356/432

(Continued)

FOREIGN PATENT DOCUMENTS

WO   WO 2011162787 A1   12/2011
WO   WO 2014205007 A1   12/2014

OTHER PUBLICATIONS

W Freudiger Christian: "Harvard University Graduate School of Arts and Sciences", Dissertation, Jan. 20, 2011 (Jan. 20, 2011), XP055327869, pp. 26-30.

(Continued)

*Primary Examiner* — Mishawn N. Hunter
(74) *Attorney, Agent, or Firm* — Leydig, Voit & Mayer, Ltd.

(57) ABSTRACT

An electric circuit for a microscope includes a lock-in amplifier. The lock-in amplifier has an input for an input signal, an input for a reference signal, an output for an output signal and a bandwidth filter configured such that a low bandwidth frequency value and/or a high bandwidth frequency value is variably settable. A dynamic bandwidth controller is configured to receive at least one parameter of a current setting of the microscope as an input, and to control the low bandwidth frequency value and/or the high bandwidth frequency value of the lock-in amplifier as a function of the at least one parameter of the current setting of the microscope.

11 Claims, 5 Drawing Sheets

(51) Int. Cl.
*G02B 21/00* (2006.01)
*G01J 3/02* (2006.01)

(56) References Cited

U.S. PATENT DOCUMENTS

| | | | |
|---|---|---|---|
| 2003/0067607 A1* | 4/2003 | Wolleschensky | G02B 21/0024 356/484 |
| 2010/0046039 A1* | 2/2010 | Xie | G01J 3/44 358/471 |
| 2010/0252750 A1* | 10/2010 | Xie | G01N 21/636 250/459.1 |
| 2012/0276578 A1* | 11/2012 | Stringari | G01N 21/6408 435/34 |

OTHER PUBLICATIONS

Anonymous: "User's Manual Model SR844 RD Lock-In Amplifier", Jan. 1, 2013 (Jan. 1, 2013), XP055331416, pp. 4-13.

Ji-XinCheng, et al., "Coherent Anti-Stokes Raman Scattering Microscopy: Instrumentation, Theory, and Applications", J. Phys. Chem. B, vol. 108, No. 3, Dec. 2004, pp. 827-840.

Conor L. Evans, et al., "Coherent Anti-Stokes Raman Scattering Microscopy: Chemical Imaging for Biology and Medicine", Annual Review of Analytical Chemistry, Dec. 2008, pp. 883-909.

Christian W. Freudiger, et al., "Optical Heterodyne-Detected Raman-Induced Kerr Effect (OHD-RIKE) Microscopy", The Journal of Physical Chemistry B, vol. 115, No. 18, Apr. 19, 2011, pp. 5574-5581.

Christian W. Freudiger, et al., "Label-Free Biomedical Imaging with High Sensitivity by Stimulated Raman Scattering Microscopy", Science, vol. 322, Issue 5909, Dec. 19, 2008, pp. 1-4.

P. Nandakumar, et al., "Vibrational imaging based on stimulated Raman scattering microscopy", New Journal of Physics, vol. 11, Dec. 2009, pp. 1-10.

Brian G. Saar, et al., "Video-Rate Molecular Imaging in Vivo with Stimulated Raman Scattering", Science, vol. 330, Dec. 2, 2010, pp. 1368-1370.

Mikhail N. Slipchenko, et al., "Heterodyne detected nonlinear optical imaging in a lock-in free manner", Journal of Biophotonics 1-7, Dec. 2012, pp. 1-17.

Lu Wei, et al., "Pump-probe optical microscopy for imaging nonfluorescent chromophores", Young Investigators in Analytical and Bioanalytical Science, Mar. 13, 2012, pp. 2197-2202.

Andreas Zumbusch, et al., "Three-Dimensional Vibrational Imaging by Coherent Anti-Stokes Raman Scattering", Physical Review Letters, vol. 82, No. 20, May 17, 1999, pp. 4142-4145.

\* cited by examiner

DYNAMIC LOCK-IN DETECTION BANDWIDTH FOR SRS IMAGING

CROSS-REFERENCE TO PRIOR APPLICATIONS

This application is a U.S. National Stage Application under 35 U.S.C. § 371 of International Application No. PCT/EP2016/074176 filed on Oct. 10, 2016, and claims benefit to European Patent Application No. EP 15189132.2 filed on Oct. 9, 2015. The International Application was published in English on Apr. 13, 2017 as WO 2017/060519 A1 under PCT Article 21(2).

FIELD

The present invention relates to an electric circuit for a microscope and a microscope with such an electric circuit. The subject-matter according to the invention is preferably useful in connection with stimulated Raman scattering microscopy (SRS) [1, 2] and provides an automatic adaptable lock-in detection bandwidth (or time-constant) for optimal imaging for various imaging settings.

BACKGROUND

Recently, coherent Raman scattering microscopy (CRSM) has gained a lot of importance and usage for performing chemical imaging of biological/pharmaceutical/food science-related specimen. The advantage of CRSM over traditional Raman microscopy is the higher speed of imaging. Coherent anti-Stokes Raman scattering (CARS), coherent Stokes Raman scattering (CSRS), Raman-induced Kerr-effect scattering (RIKES) and stimulated Raman scattering (SRS) constitute various CRSM techniques.

The technique of CRSM consists of two pulsed (with frequencies ranging typically from 1-100 MHz) optical fields with pulse widths ranging from 100 fs-20 ps of different wavelengths routed through a confocal microscope system and tightly focused on a sample of interest. The beam routing and the focusing optics are made such that the two optical fields overlap spatially and temporally at the sample. For SRS or heterodyned-RIKES imaging, one of the two beams is either intensity modulated or frequency modulated or polarization modulated with a specific frequency $\Omega$, typically in kHz to MHz range, before it interacts with the other optical field in the sample.

For SRS and RIKES imaging, one detects the initially unmodulated light beam and using a lock-in [1-2, 5] or an envelope detection technique [6], the modulation of intensity is extracted and displayed as an image. Due to the interaction with the sample, a third light field, in case of CARS and CSRS, is detected and displayed as an image [7-9]. In all the above CRSM techniques, the signal is strong only when the frequency difference between the incident fields matches a vibrational resonance frequency in the sample.

Among the various coherent Raman imaging techniques, SRS imaging has gained popularity in the recent times because of the absence of non-resonant background in the images. In the following, it is concentrated exclusively on SRS imaging methodology. However, the conclusions derived are directly applicable to CRSM, CARS, CSRS and RIKES imaging. It is simply a matter of using appropriate polarization elements, detection units, and optical filters to extract these signals and these are well known and described in the existing literature.

Figure 1:
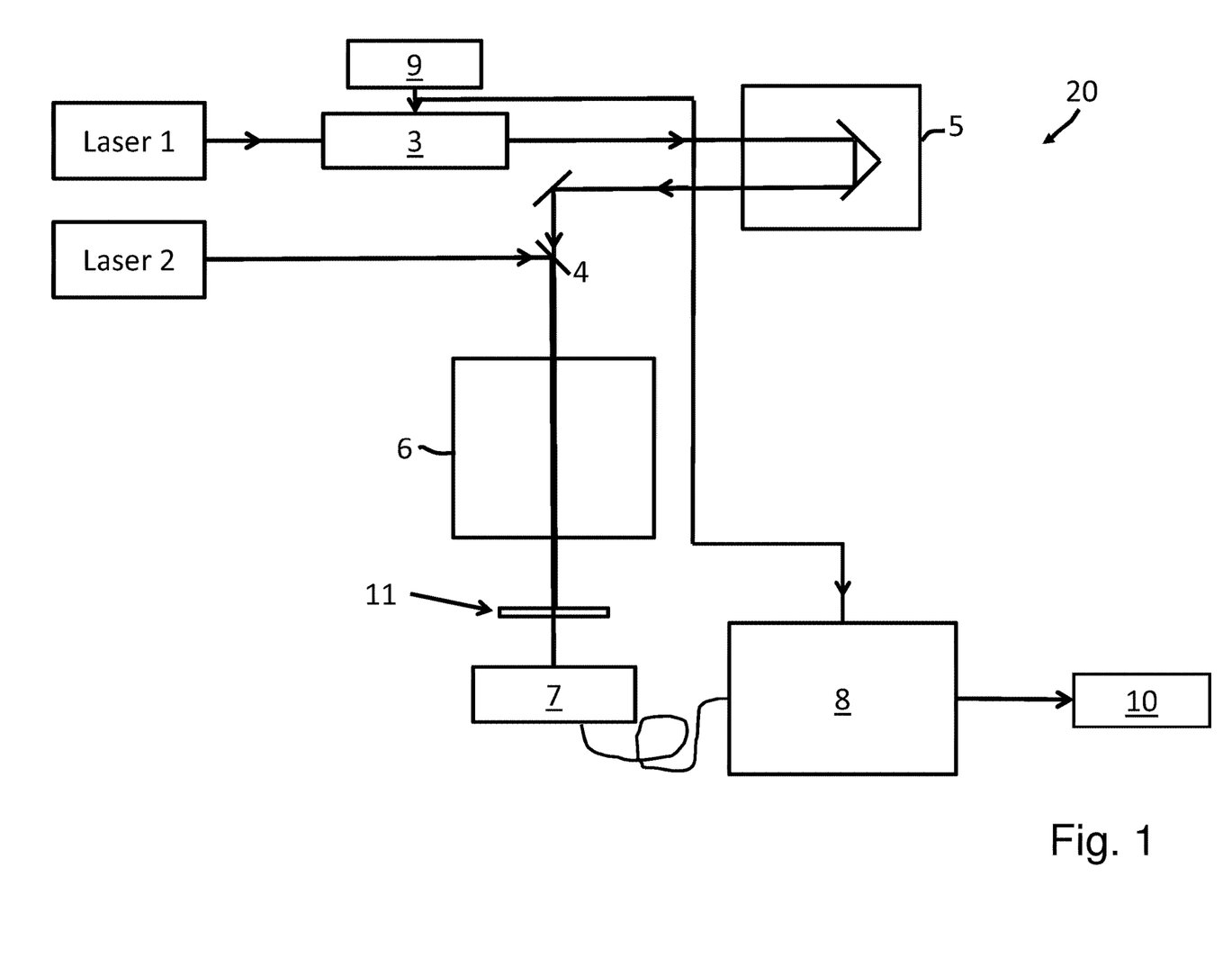
FIG. 1 shows a preferred embodiment of a SRS microscope system usable for the invention.

A typical SRS microscope system 20 is depicted in FIG. 1. Two pulsed laser sources (Laser 1 and Laser 2) generate the so called "Stokes" and the "pump" beams for SRS imaging, respectively (see FIG. 2, window 100, where an intensity is shown over time t). Typically, the laser source with smaller wavelength is designated as the "pump" and the laser with longer wavelength is designated as the "Stokes" beam in the CRSM literature. One of the beams (Laser 1) is amplitude modulated with the help of a modulator 3, e.g. an AOM (acousto-optic modulator) or EOM (electro-optic modulator), and combined collinearly with the second laser source (Laser 2) using a dichroic 4. The modulator 3 is driven by a RF drive 9 providing a RF frequency signal.

The temporal overlap of the two laser sources is ensured with the help of a preferably variable—optical delay stage 5. The combined beams travel through a scanning-device or laser-scanning (confocal) microscope 6 and interact with the sample under test at the focus of a microscope objective (not shown). Behind the sample the beam of Laser 1 is blocked by a blocking filter 11.

Figure 2:
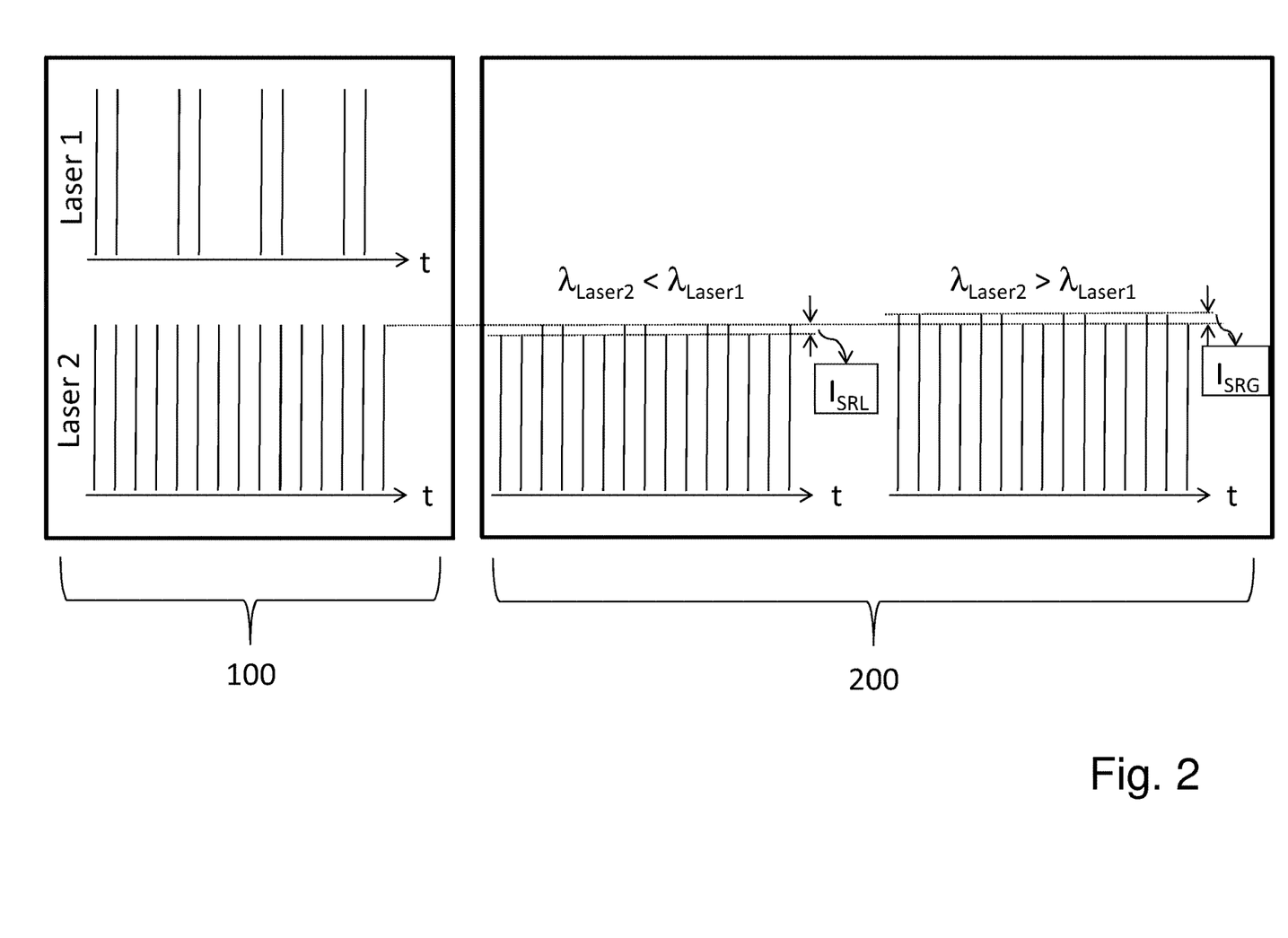
FIG. 2 shows input and output laser beam intensities in a SRS microscope system usable for the invention.

Due to the interaction with the sample, the light of Laser 2 acquires a tiny amplitude modulation whose frequency corresponds to the modulation frequency of the light of Laser 1 (see FIG. 2, window 200).

When both the beams hit the sample, the light of the Laser 2 could gain or lose energy depending on its relative (to the light of the Laser 1) wavelength. If the wavelength of Laser 2 is smaller than the wavelength of Laser 1, i.e. $\lambda_{Laser2} < \lambda_{Laser2}$, there is an intensity loss $I_{SRL}$, otherwise a gain $I_{SRG}$.

This miniscule gain or loss in Laser 2 is detected with the help of a sensitive detector 7 and signal extraction electronics 8. The latter electronic unit can comprise a lock-in amplifier/mixer; the SRS signal is demodulated using the RF drive frequency of the modulator 3 as the local oscillator. The resultant signal is routed for image display, storage or analysis 10.

It has been demonstrated that using appropriate detector and low-noise electronics it is possible to make SRS imaging sensitive enough for real-time imaging (25 frames-per-second) [3].

A lock-in amplifier is an important component of the detection electronics required for extraction of modulated SRS signals. Although the SRS detection has been implemented using envelope detection electronics [6], use of a lock-in detection provides flexible detection bandwidth (implies, varied laser scan frequencies) and higher signal linearity.

Figure 3:
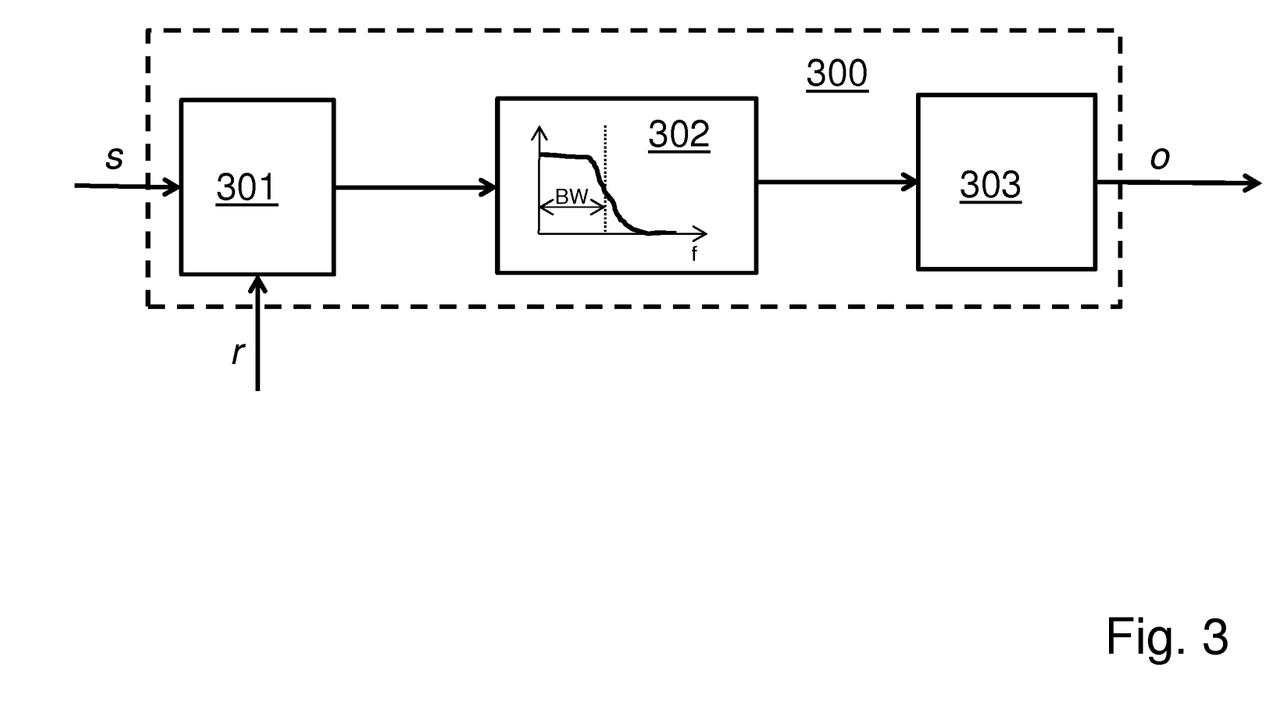
FIG. 3 shows a preferred embodiment of a lock-in amplifier usable for the invention.

A basic lock-in amplifier 300, as shown in FIG. 3, comprises an electronic mixer 301 which takes as its input an amplitude modulated signal s and a reference clock signal r. It provides as an output the demodulated signal of s at the reference frequency provided by r. In addition, commercially available lock-in amplifiers can provide some amount of signal amplification 303 and filtering 302 at the input and/or output ports. The frequency bandwidth of the extracted signal o depends on the bandwidth setting BW of the filter 302 at the output stage of the mixer. This bandwidth setting typically ranges from a few tenths of Hz to multiple MHz (or equivalently, a few tens of seconds to a few nanoseconds).

In an SRS imaging session, one usually changes various image acquisition parameters to obtain a good image or an image which comprises the part/parts of the imaged object which is/are of interest for the user of the microscope. For example, since the Raman signals are much weaker in the fingerprint-region (500 cm$^{-1}$-1800 cm$^{-1}$), one would need to increase the pixel dwell-time and perform slow scanning for obtaining good SRS image. Other acquisition parameters which could be modified based on the imaging requirements include laser-scan/stage-scan speed, objective magnification, objective numerical aperture, image scan format (pixel size), image scan width (physical image size), pixel dwell time, zoom, etc. Changing any of these values would lead to a different bandwidth of the modulated signal. If the lock-in time-constant is fixed, varying these parameters could deteriorate image quality.

SUMMARY

In an embodiment, the present invention provides an electric circuit for a microscope including a lock-in amplifier. The lock-in amplifier has an input for an input signal, an input for a reference signal, an output for an output signal and a bandwidth filter configured such that a low bandwidth frequency value and/or a high bandwidth frequency value is variably settable. A dynamic bandwidth controller is configured to receive at least one parameter of a current setting of the microscope as an input, and to control the low bandwidth frequency value and/or the high bandwidth frequency value of the lock-in amplifier as a function of the at least one parameter of the current setting of the microscope.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

In an embodiment, the present invention provides a suitable setting of the lock-in output filter bandwidth. Preferably, it should be possible to obtain a good image with respect to the signal-to-noise ratio for any given image acquisition parameters.

According to an embodiment of the invention, an electric circuit for a microscope, in particular for a Coherent Raman scattering microscope (CRSM), a Coherent anti-Stokes Raman scattering (CARS) microscope, a coherent Stokes Raman scattering (CSRS) microscope, a Raman-induced Kerr-effect scattering (RIKES) microscope, a stimulated Raman scattering (SRS) microscope or a pump-probe microscope, comprising a lock-in amplifier, wherein the lock-in amplifier comprises an input for an input signal, an input for a reference signal, an output for an output signal, and a bandwidth filter device, wherein the bandwidth filter device is adapted such that a low bandwidth frequency value and/or a high bandwidth frequency value is variably settable, wherein the electric circuit comprises a dynamic bandwidth controller unit into which at least one parameter of a current setting of the microscope is input, wherein the dynamic bandwidth controller unit is adapted to control the low bandwidth frequency value and/or the high bandwidth frequency value of the lock-in amplifier as a function of the at least one parameter of a current setting of the microscope, and a microscope (system), in particular one of the types mentioned, having such an electric circuit are proposed. Advantageous further developments form the subject matter of the dependent claims and of the subsequent description.

An embodiment of the present invention provides the advantage that the bandwidth of the lock-in amplifier can be adapted to the current setting such that a maximal measurement bandwidth spectrum is obtained as the output signal for further signal and/or image processing.

Embodiments of the invention provide a method and an apparatus for implementing e.g. stimulated Raman scattering microscopy (SRS) with an automatic adaptable lock-in detection bandwidth (or time-constant) for optimal imaging for various imaging settings. One aspect of this invention is to provide a device and a method in which the lock-in bandwidth/time-constant is automatically adapted (increased or decreased) to deliver a high quality image and/or the best possible image for a given set of image acquisition parameters. The described apparatus can be directly applied for other lock-in based imaging techniques such as OHD-RIKES [2], and pump-probe microscopy techniques [4].

Advantageously the at least one parameter of a current setting of the microscope is at least one of a pixel dwell-time, a laser-scan speed, a stage-scan speed, an objective magnification, an objective numerical aperture, an image scan format or a pixel size, an image scan width or a physical image size, and a zoom value. According to a preferred embodiment, the function of the at least one parameter of a current setting of the microscope is at least one of inversely proportional to the pixel dwell-time, proportional to the laser-scan speed, proportional to the stage-scan speed, inversely proportional to the objective magnification, proportional to the objective numerical aperture, proportional to the image scan format or the pixel size, proportional to the image scan width or the physical image size, and inversely proportional to the zoom value. Using these parameters allows for easily adapting the measurement bandwidth to the current microscope setting.

It is preferred that the dynamic bandwidth controller unit is adapted to control the low bandwidth frequency value and/or the high bandwidth frequency value of the lock-in amplifier depending on a potential highest temporal frequency in a demodulated signal, i.e. to set the low bandwidth frequency value and/or the high bandwidth frequency value of the lock-in amplifier to a value depending on said potential highest temporal frequency. Preferably, the value is equal to said potential highest temporal frequency or differs at most 10%, 20%, 30%, 40% or 50% from said potential highest temporal frequency. Thus, a good suitable bandwidth spectrum is obtained.

Advantageously the dynamic bandwidth controller unit is adapted to control the low bandwidth frequency value and/or the high bandwidth frequency value of the lock-in amplifier depending on at least one of a wavelength λ of light being focused onto an object, a numerical aperture $NA_{MO}$ of a microscope objective, a system dependent length $F_{Sys}$ which depends on a magnification of the microscope optics, a magnification $M_{MO}$ of the microscope objective, a value Zoom representing an additional—preferably variable settable—magnification of a beam path of the microscope, a duty cycle fill of the laser scan, and a scan frequency $f_{scan}$. This allow for precisely tuning the bandwidth.

According to a preferred embodiment the dynamic bandwidth controller unit comprises a control circuit functionality which calculates the low bandwidth frequency value and/or the high bandwidth frequency value as the function of the at least one parameter of a current setting of the microscope, wherein the calculated low bandwidth frequency value and/or the high bandwidth frequency value is set in the lock-in amplifier and at least one image acquisition is conducted and the measurement bandwidth spectrum of the acquired signal is analysed.

The dynamic bandwidth controller unit can be formed as a hardware and/or software module, in particular as an ASIC (Application Specific Integrated Circuit) or in a FPGA (Field Programmable Gated Array) or DSP (Digital Signal Processor).

Further advantages and embodiments of the invention will become apparent from the description and the appended figures.

It should be noted that the previously mentioned features and the features to be further described in the following are usable not only in the respectively indicated combination, but also in further combinations or taken alone, without departing from the scope of the present invention.

In the following, the invention is described exemplarily on basis of a SRS microscope system as shown in FIGS. 1 to 3.

For SRS imaging it is very advantageous to choose the correct bandwidth based on the bandwidth of the modulated SRS signal due to laser-scanning or stage-scanning; choosing a lock-in output filter bandwidth much larger than the signal bandwidth would lead to noisy images and on the other hand setting a narrow filter bandwidth would lead to blurred images.

Firstly, the case of laser scanning system is considered. The bandwidth of the modulated signal is determined by the speed with which the illumination/excitation laser beam is scanned across the object. If $w_{pixel}$ is defined as the length in the sample object which is represented as a single point or pixel in the acquired image, then the transit speed of the laser beam across the pixel is given by $$v_{transit} = \frac{w_{pixel}}{t_{pixel}}$$

where
$t_{pixel}$ is the pixel dwell-time.

The pixel width $w_{pixel}$ is determined by the magnification of (a) the objective and (b) the relay optics in the confocal scanner and also on length across which the laser light is scanned, which is given by the "Zoom" parameter in a typical commercial laser scanning microscope system.

On the other hand, the pixel dwell-time $t_{pixel}$ is determined by the frequency of the laser scan, the number of pixels in a single line and the time it takes to scan a single line. The pixel dwell-time can be represented as follows:

$$t_{pixel} = \frac{\left(\frac{fill}{f_{scan}}\right)}{N_{pixels}}$$

where
fill is the duty cycle of the laser scan (the factor of the single scan period during which the laser is on for imaging/excitation),
$f_{scan}$ is the scan frequency, and
$N_{pixels}$ is the number of pixels in a single line of the image.

The pixel size is given by:

$$w_{pixel} = \frac{\left(\frac{F_{Sys}}{Zoom \cdot M_{MO}}\right)}{N_{pixels}}$$

where
$F_{Sys}$ is a system dependent length which depends on the magnification of the relay optics, and the scan lens/tube lens combination,
$M_{MO}$ is the magnification of the objective, and
Zoom is a value representing an additional—preferably variable settable—magnification of a beam path of the microscope.

Based on the above formulae, the transit speed of the laser spot across a pixel is given by:

$$v_{transit} = \frac{F_{Sys} \cdot f_{scan}}{Zoom \cdot M_{MO} \cdot fill}$$

Since the focused spot size is determined by the Airy diameter $D_{Airy}$, the largest temporal frequency that is generated due to the scanning of the laser spot across the sample can be estimated as:

$$f_{High} = \frac{v_{transit}}{D_{Airy}}$$

where $$D_{Airy} = \frac{1.22\,\lambda}{NA_{MO}}$$

is the Airy diameter with λ being the wavelength of light that is being focused onto the sample and
$NA_{MO}$ is the numerical aperture of the objective.

Hence, the potential highest temporal frequency in the demodulated signal (e.g. output of mixer 301 in FIG. 2) is given by $$f_{High} = \frac{F_{Sys} \cdot f_{scan} \cdot NA_{MO}}{1.22\,\lambda \cdot Zoom \cdot M_{MO} \cdot fill}$$

Thus, the frequency content of the demodulated signal depends on the various system and scan parameters. If any of these parameters change, the frequency content in the signal is bound to change. Hence, the output low-pass filter should have a bandwidth that is broad enough to let $f_{High}$ through; it should not be too broad otherwise one would have noisy images with the noise coming from the frequency spectrum beyond $f_{High}$.

In a typical laser scanning experiment, one would like to change the "zoom" factor to zoom into a certain portion of the image to visualize a particular region more closely. This zoom could change by a factor of up to 64 in a commercial microscope system. Similarly, the scan frequency $f_{scan}$, with all other parameters being constant, could vary up to a factor of 1200 in a commercial microscope system. This implies $f_{High}$ could change by three orders of magnitude.

Figure 4:
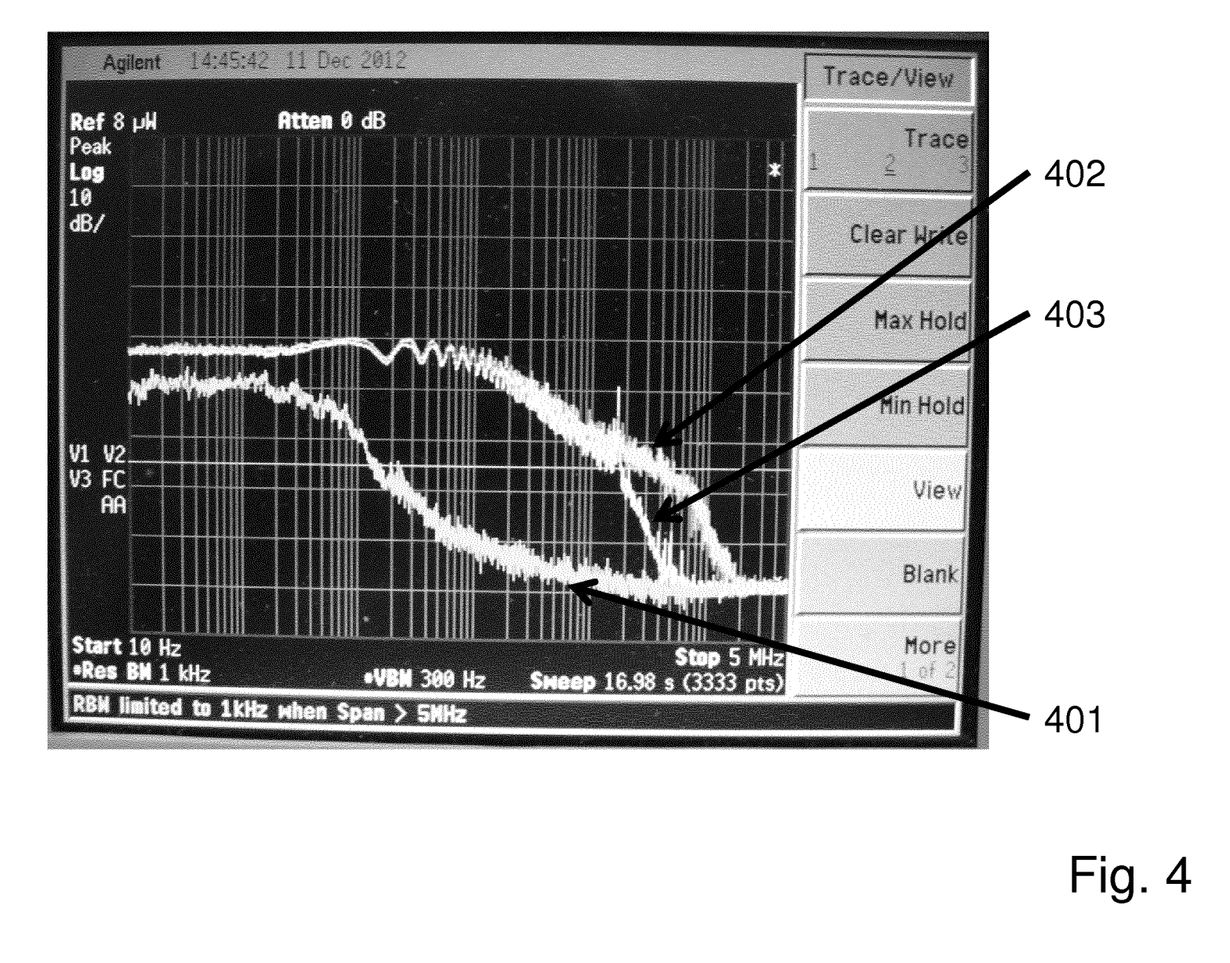
FIG. 4 shows exemplary signals in a lock-in amplifier usable for the invention.

A representative example of the dependence of the signal bandwidth on the scan parameters is shown in FIG. 4. FIG. 4 is a screenshot of the signal in frequency domain as measured with an Agilent spectrum analyser (Model E7401A). Line 401 corresponds to the baseline noise curve with no light incident on the detector. Line 402 corresponds to the signal that is generated with the zoom parameter set to 0.75. Line 403 corresponds to the signal with the zoom parameter set to 1.0.

The rest of the scan parameters for generating these three curves were: $M_{MO}=20$, $NA_{MO}=0.75$, $f_{scan}=600$ Hz and $N_{pixels}=512$.

One can clearly notice the difference between lines 402 and 403; for larger zoom, the laser traverses each pixel a bit slower. Consequently, this leads to a reduction in the signal bandwidth for larger zooms. Having a fixed bandwidth low-pass filter would lead to deterioration of the image with respect to the signal to noise ratio when the "zoom" increases. Instead, if the bandwidth of the filter is tuneable according to the invention, then the image quality can be retained irrespective of changes in any of the scan/microscope parameters.

Hence, it is proposed that an electronic circuit, or a software module or a combination of hardware/software module(s) be used which take(s) into account the changes in the scan parameters that might be initiated by a user of the microscope and modify (modifies) the output low-pass filters' bandwidth to let the highest possible signal frequencies through for further processing or display or storage.

Figure 5:
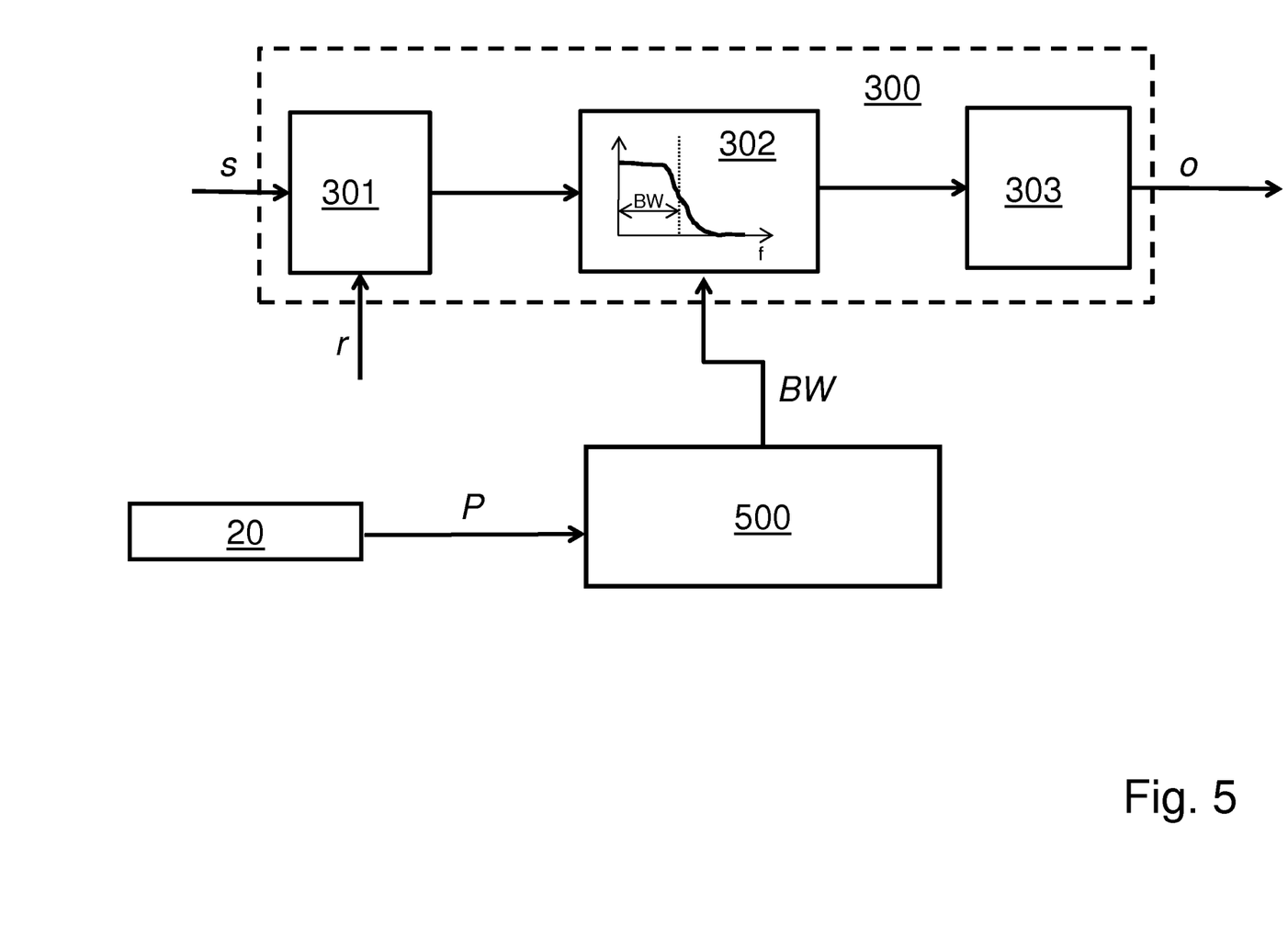
FIG. 5 shows a preferred embodiment of a lock-in amplifier and a dynamic bandwidth controller unit according to the invention.

A pictorial representation of the concept of the present invention is shown in FIG. 5. In a particular embodiment of the present invention, a commercial lock-in UHFLI from Zurich Instruments AG, Zurich, Switzerland along with a software module 500 was used; the latter determines the scan parameters P, calculates the bandwidth values BW and sets this value in the lock-in amplifier unit 300.

Similar analysis can be performed for a stage scanning microscope while noting that the pixel dwell time $t_{pixel}$ and the pixel width $w_{pixel}$ are given by the speed of the stage scanner and the Airy diameter of the focus respectively. But the basic idea described above is still valid and can be readily applied for this case too.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCES

1. Nandakumar, P.; Kovalev, A. & Volkmer, A., Vibrational imaging based on stimulated Raman scattering microscopy, New Journal of Physics, 2009, 11, 033026
2. W. Freudiger, W. Min, B. G. Saar, S. Lu, G. R. Holtom, C. He, J. C. Tsai, J. X. Kang, and X. S. Xie, "Label-Free Biomedical Imaging with High Sensitivity by Stimulated Raman Scattering Microscopy," Science 322, 1857-1861 (2008).
3. Freudiger, C. W.; Roeffaers, M. B. J.; Zhang, X.; Saar, B. G.; Min, W. & Xie, X. S., Optical heterodyne-detected Raman-induced Kerr effect (OHD-RIKE) microscopy, Journal of Physical Chemistry B, 2011, 115, 5574-5581
4. Wu Wei and Wei Min, Pump-probe optical microscopy for imaging nonfluorescent chromophores, Anal Bioanal Chem, 2012, 403, 2197-2202.
5. Saar, B. G.; Freudiger, C. W.; Reichman, J.; Stanley, C. M.; Holtom, G. R. & Xie, X. S., Video-rate molecular imaging in vivo with stimulated Raman scattering, Science, 2010, 330, 1368-1370
6. Mikhail N. Slipchenko; Robert A. Oglesbee; Delong Zhang; WeiWu; and Ji-Xin Cheng, Heterodyne detected nonlinear optical imaging in a lock-in free manner, J. Biophotonics, 2012, 5, 1-7
7. A. Zumbusch, G. R. Holtom, and X. S. Xie, Three-dimensional vibrational imaging by coherent anti-Stokes Raman scattering, Phys. Rev. Lett., 1999, 82, 4142-4145
8. J. X. Cheng and X. S. Xie, Coherent anti-Stokes Raman scattering microscopy: Instrumentation, theory, and applications, J. Phys. Chem. B, 2004, 108, 827-840
9. C. L. Evans and X. S. Xie, Coherent anti-stokes Raman scattering microscopy: chemical imaging for biology and medicine, Annu. Rev. Anal. Chem, 2008, 1, 883-909.

The invention claimed is:

1. An electric circuit for a microscope comprising:
a lock-in amplifier, the lock-in amplifier comprising:
    an input for an input signal;
    an input for a reference signal;
    an output for an output signal; and
    a bandwidth filter configured such that a low bandwidth frequency value and/or a high bandwidth frequency value is variably settable, and
a dynamic bandwidth controller configured to:
    receive at least one parameter of a current setting of the microscope as an input; and
    control the low bandwidth frequency value and/or the high bandwidth frequency value of the lock-in amplifier as a function of the at least one parameter of the current setting of the microscope,
wherein the at least one parameter of the current setting of the microscope is at least one of the following:
a pixel dwell-time,
a laser-scan speed,
a stage-scan speed, an objective magnification,
an objective numerical aperture,
an image scan format or a pixel size,
an image scan width or a physical image size, or
a zoom value.

2. The electric circuit of claim 1, wherein the function of the at least one parameter of the current setting of the microscope is at least one of the following:
inversely proportional to the pixel dwell-time,
proportional to the laser-scan speed,
proportional to the stage-scan speed,
inversely proportional to the objective magnification,
proportional to the objective numerical aperture,
proportional to the image scan format or the pixel size,
proportional to the image scan width or the physical image size, or
inversely proportional to the zoom value.

3. The electric circuit of claim 1, wherein the dynamic bandwidth controller is adapted to control the low bandwidth frequency value and/or the high bandwidth frequency value of the lock-in amplifier depending on a potential highest temporal frequency in a demodulated signal.

4. The electric circuit of claim 3, wherein the potential highest temporal frequency in the demodulated signal is given by the formula:

$$f_{High} = \frac{F_{Sys} \cdot f_{scan} \cdot NA_{MO}}{1.22 \, \lambda \cdot Zoom \cdot M_{MO} \cdot \text{fill}}.$$

5. The electric circuit of claim 1, wherein the dynamic bandwidth controller is adapted to control the low bandwidth frequency value and/or the high bandwidth frequency value of the lock-in amplifier depending on at least one of the following:
a wavelength $\lambda$ of light being focused onto an object,
a numerical aperture $NA_{MO}$ of a microscope objective,
a system dependent length $F_{Sys}$ which depends on a magnification of the microscope optics,
a magnification $M_{MO}$ of the microscope objective,
a value Zoom representing an additional magnification of a beam path of the microscope,
a duty cycle fill of the laser scan, or
a scan frequency $f_{scan}$.

6. The electric circuit of claim 5, wherein the dynamic bandwidth controller is adapted to control the low bandwidth frequency value and/or the high bandwidth frequency value of the lock-in amplifier as a function being at least one of the following:
inversely proportional to the wavelength $\lambda$ of light being focused onto an object,
proportional to the numerical aperture $NA_{MO}$ of a microscope objective,
proportional to the system dependent length $F_{Sys}$ which depends on a magnification of the microscope optics,
inversely proportional to the magnification $M_{MO}$ of the microscope objective,
inversely proportional to the value Zoom representing an additional magnification of a beam path of the microscope,
inversely proportional to the duty cycle fill of the laser scan, or proportional to the scan frequency $f_{scan}$.

7. The electric circuit of claim 1, wherein the dynamic bandwidth controller comprises a control circuit functionality which calculates the low bandwidth frequency value and/or the high bandwidth frequency value as the function of the at least one parameter of the current setting of the microscope, wherein the calculated low bandwidth frequency value and/or the high bandwidth frequency value is set in the lock-in amplifier such that at least one image acquisition is conductable and a measurement bandwidth spectrum of an acquired signal is analysable based on the calculated and set low bandwidth frequency value and/or the high bandwidth frequency value.

8. The electric circuit of claim 1, wherein the dynamic bandwidth controller is formed as a hardware and/or software module.

9. A microscope comprising the electric circuit according to claim 1.

10. An electric circuit for a microscope comprising:
a lock-in amplifier, the lock-in amplifier comprising:
an input for an input signal;
an input for a reference signal;
an output for an output signal; and
a bandwidth filter configured such that a low bandwidth frequency value and/or a high bandwidth frequency value is variably settable, and
a dynamic bandwidth controller configured to:
receive at least one parameter of a current setting of the microscope as an input; and
control the low bandwidth frequency value and/or the high bandwidth frequency value of the lock-in amplifier as a function of the at least one parameter of the current setting of the microscope,
wherein the dynamic bandwidth controller is adapted to control the low bandwidth frequency value and/or the high bandwidth frequency value of the lock-in amplifier depending on at least one of the following:
a wavelength $\lambda$ of light being focused onto an object,
a numerical aperture $NA_{MO}$ of a microscope objective,
a system dependent length $F_{Sys}$ which depends on a magnification of the microscope optics,
a magnification $M_{MO}$ of the microscope objective,
a value Zoom representing an additional magnification of a beam path of the microscope,
a duty cycle fill of the laser scan, or
a scan frequency $f_{scan}$, and
wherein the dynamic bandwidth controller is adapted to control the low bandwidth frequency value and/or the high bandwidth frequency value of the lock-in amplifier as a function being at least one of the following:
inversely proportional to the wavelength $\lambda$ of light being focused onto an object,
proportional to the numerical aperture $NA_{MO}$ of a microscope objective,
proportional to the system dependent length $F_{Sys}$ which depends on a magnification of the microscope optics,
inversely proportional to the magnification $M_{MO}$ of the microscope objective,
inversely proportional to the value Zoom representing an additional magnification of a beam path of the microscope,
inversely proportional to the duty cycle fill of the laser scan, or
proportional to the scan frequency $f_{scan}$.

11. An electric circuit for a microscope comprising:
a lock-in amplifier, the lock-in amplifier comprising:
an input for an input signal;
an input for a reference signal;
an output for an output signal; and
a bandwidth filter configured such that a low bandwidth frequency value and/or a high bandwidth frequency value is variably settable, and a dynamic bandwidth controller configured to:
receive at least one parameter of a current setting of the microscope as an input; and
control the low bandwidth frequency value and/or the high bandwidth frequency value of the lock-in amplifier as a function of the at least one parameter of the current setting of the microscope,
wherein the dynamic bandwidth controller is adapted to control the low bandwidth frequency value and/or the high bandwidth frequency value of the lock-in amplifier depending on a potential highest temporal frequency in a demodulated signal, and
wherein the potential highest temporal frequency in the demodulated signal is given by the formula:

$$f_{High} = \frac{F_{Sys} \cdot f_{scan} \cdot NA_{MO}}{1.22 \, \lambda \cdot Zoom \cdot M_{MO} \cdot fill}.$$

\* \* \* \* \*